United States Patent
Kobayashi et al.

(10) Patent No.: US 6,706,798 B2
(45) Date of Patent: Mar. 16, 2004

(54) WATER REPELLENT SILICONE COATING AGENT COMPOSITION

(75) Inventors: Hideki Kobayashi, Chiba Prefecture (JP); Motoshi Sasaki, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/997,749

(22) Filed: Nov. 29, 2001

(65) Prior Publication Data

US 2002/0077412 A1 Jun. 20, 2002

(30) Foreign Application Priority Data

Dec. 15, 2000 (JP) ........................................ 2000-381397
Jun. 26, 2001 (JP) ........................................ 2001-193663

(51) Int. Cl.$^7$ ................................................. C08K 3/36
(52) U.S. Cl. .................. 524/493; 524/268; 106/287.12; 106/287.14; 106/287.16
(58) Field of Search ................................ 524/493, 268; 106/287.12, 287.14, 287.16

(56) References Cited

U.S. PATENT DOCUMENTS

| | | | |
|---|---|---|---|
| 5,331,074 A | | 7/1994 | Slater, deceased et al. ... 528/14 |
| 5,789,480 A | * | 8/1998 | Adachi et al. ............... 524/863 |
| 5,959,005 A | * | 9/1999 | Hartmann et al. .......... 523/213 |
| 6,288,143 B1 | | 9/2001 | Caradori et al. ............ 523/213 |
| 6,511,754 B1 | | 1/2003 | Bohin et al. ................ 428/447 |

FOREIGN PATENT DOCUMENTS

| | | | |
|---|---|---|---|
| EP | 0881269 | 12/1998 | ........... C09D/5/16 |
| GB | 2 001 303 | * 1/1978 | |
| JP | 10-279806 | 10/1988 | ........... C08L/83/06 |

OTHER PUBLICATIONS

Abstract JP 10–279806, Oct. 20, 1988.

* cited by examiner

*Primary Examiner*—Margaret G. Moore
(74) *Attorney, Agent, or Firm*—Jim L. DeCesare

(57) ABSTRACT

A water repellent silicone coating agent composition comprising (A) a diorganopolysiloxane having a viscosity of 20 to 20,000 mPa·s at 25° C. in which the terminal ends of the molecular chain are blocked by silanol groups or silicon-bonded hydrolyzable groups, (B) a cross-linking agent represented by general formula $R_aSiX_{4-a}$, in which R is a monovalent hydrocarbon group comprising 1 to 10 carbon atoms, X is a hydrolyzable group, and subscript a is an integer of 0 to 2, (C) a condensation reaction catalyst, (D) a hydrophobic surface treated dry process silica having a carbon content of 3.7 to 5% by weight and a bulk density of 40 to 99 g/L, or a hydrophobic surface treated dry process silica having a carbon content of 2.7 to 5% by weight and a bulk density of 100 to 300 g/L, (E) an organic functional silane coupling agent-based adhesion-imparting agent, (F) an organic solvent, and optionally (G) a non-reactive silicone fluid.

18 Claims, No Drawings

WATER REPELLENT SILICONE COATING AGENT COMPOSITION

FIELD OF THE INVENTION

The present invention relates to a water repellent silicone coating agent composition. Specifically, it relates to a water repellent silicone coating agent composition possessing superior flowability and coating properties and capable of forming cured films exhibiting excellent water repellent properties after coating.

BACKGROUND OF THE INVENTION

Typically, water repellent silicone coating agents are used in a state in which their solid matter is diluted with an organic solvent, and, as a result of the evaporation of the organic solvent after coating, form cured coating films exhibiting water repellent properties. However, coating agents diluted with a large amount of organic solvent present problems in terms of environmental safety and hygiene, and in recent years they have been gradually phased out. On the other hand, if the amount of the organic solvent combined therewith is small, the viscosity of the coating agent increases, and as a result its flowability and coating properties decrease, which makes obtaining a uniform coating film more difficult. For these reasons, there is demand for silicone coating agents that are capable of forming cured films exhibiting excellent water repellent properties after coating and which possess superior flowability and coating properties even without using a large amount of organic solvent.

It is an object of the present invention to provide a water repellent silicone coating agent composition possessing superior flowability and coating properties and capable of forming cured films exhibiting excellent water repellent properties after coating.

SUMMARY OF THE INVENTION

The present invention is a water repellent silicone coating agent composition comprising (A) 100 parts by weight of diorganopolysiloxane having a viscosity of 20 to 20,000 mPa·s at 25° C. in which the terminal ends of the molecular chain are blocked by silanol groups or silicon-bonded hydrolyzable groups, (B) 5 to 100 parts by weight of a cross-linking agent represented by general formula $R_aSiX_{4-a}$, in which R is a monovalent hydrocarbon group comprising 1 to 10 carbon atoms, X is a hydrolyzable group, and subscript a is an integer of 0 to 2, (C) 0.1 to 20 parts by weight of a condensation reaction catalyst, (D) 8 to 50 parts by weight of a hydrophobic surface treated dry process silica having a carbon content of 3.7 to 5% by weight and a bulk density of 40 to 99 g/L, or a hydrophobic surface treated dry process silica having a carbon content of 2.7 to 5% by weight and a bulk density of 100 to 300 g/L, (E) 1 to 10 parts by weight of an organic functional silane coupling agent-based adhesion-imparting agent, (F) an organic solvent having a boiling point of 100 to 200° C. in an amount of 4 to 100 wt % based on the total of component (A) to component (E), and optionally (G) 1 to 50 parts by weight of a non-reactive silicone fluid having a viscosity of 10 to 10,000 mPa·s at 25° C.

DESCRIPTION OF THE INVENTION

The present invention is a water repellent silicone coating agent composition comprising (A) 100 parts by weight of diorganopolysiloxane having a viscosity of 20 to 20,000 mPa·s at 25° C. in which the terminal ends of the molecular chain are blocked by silanol groups or silicon-bonded hydrolyzable groups, (B) 5 to 100 parts by weight of a cross-linking agent represented by general formula $R_aSiX_{4-a}$, in which R is a monovalent hydrocarbon group comprising 1 to 10 carbon atoms, X is a hydrolyzable group, and subscript a is an integer of 0 to 2, (C) 0.1 to 20 parts by weight of a condensation reaction catalyst, (D) 8 to 50 parts by weight of a hydrophobic surface treated dry process silica having a carbon content of 3.7 to 5% by weight and a bulk density of 40 to 99 g/L, or a hydrophobic surface treated dry process silica having a carbon content of 2.7 to 5% by weight and a bulk density of 100 to 300 g/L, (E) 1 to 10 parts by weight of an organic functional silane coupling agent-based adhesion-imparting agent, (F) an organic solvent having a boiling point of 100 to 200° C. in an amount of 4 to 100 wt % based on the total of component (A) to component (E), and optionally (G) 1 to 50 parts by weight of a non-reactive silicone fluid having a viscosity of 10 to 10,000 mPa·s at 25° C.

Hereinbelow, the present invention is explained in detail. Component (A) is a diorganopolysiloxane having a viscosity of 20 to 20,000 mPa·s at 25° C. in which the terminal ends of the molecular chain are blocked by silanol groups or silicon-bonded hydrolyzable groups and is the primary component of the present composition. Suggested hydrolyzable groups include dimethyl ketoxime, methyl ethyl ketoxime, and other diorganoketoxime groups; methoxy, ethoxy, and other alkoxy groups; acetoxy, and other acyloxy groups; N-butylamino and other organoamino groups; methylacetoamido and other organoacylamido groups; N,N-diethylhydroxyamino and other N,N-diorganohydroxyamino groups; and propenoxy, and other alkenyloxy groups. Among these, alkoxy groups are preferable. In addition, organic groups bonded to silicon atoms in the diorganopolysiloxane are exemplified by unsubstituted monovalent hydrocarbon groups such as methyl, ethyl, propyl, and other alkyl groups; vinyl, allyl, and other alkenyl groups; phenyl, and other aryl groups; and by 3,3,3-trifluoropropyl, nonafluorohexyl, and other halogen atom-substituted hydrocarbon groups. Dimethylpolysiloxane having both terminal ends of the molecular chain blocked by silanol groups or methoxy groups is preferable as the diorganopolysiloxane of component (A). The viscosity of component (A) is 20 to 20,000 mPa·s and preferably 40 to 15,000 mPa·s at 25° C.

Component (B) is a cross-linking agent represented by general formula $R_aSi_{4-a}$ in which R is a monovalent hydrocarbon group comprising 1 to 10 carbon atoms exemplified by methyl, ethyl, propyl, tert-butyl, 2-ethylhexyl, and other alkyl groups; vinyl, allyl, and other alkenyl groups; and phenyl and other aryl groups. Among these, alkyl groups and alkenyl groups are preferable and methyl is especially preferable. X is a hydrolyzable group exemplified by dimethyl ketoxime, methyl ethyl ketoxime, and other diorganoketoxime groups; methoxy, ethoxy, and other alkoxy groups; acetoxy, and other acyloxy groups; N-butylamino and other organoamino groups; methylacetoamido and other organoacylamido groups; N,N-diethylhydroxyamino and other N,N-diorganohydroxyamino groups; and propenoxy, and other alkenyloxy groups. The subscript a is an integer of 0 to 2. Suggested examples of component (B) include tetrakis(methylethylketoxime)silane, methyl tris (methylethylketoxime)silane, vinyl tris (methylethylketoxime)silane, methyltrimethoxysilane, methyltriethoxysilane, dimethyldimethoxysilane, dimethyldiethoxysilane, methyltriacetoxysilane, tetramethoxysilane, tetraethoxysilane, methyltriisopropenoxysilane, tetraisopropenoxysilane, and methyl tri(N,N-diethylamino)silane. The amount of component (B) in the present composition is 5 to 100 parts by weight per 100 parts by weight of component (A), and from the standpoint of curability preferably in the range of from 8 to 40 parts by weight on the same basis.

The condensation reaction catalyst of component (C) can be a well-known prior-art silanol condensation catalyst including dibutyltin diacetate, dibutyltin dioctoate, dibutyltin dilaurate, dibutyltin dimalate, dioctyltin dilaurate, dioctyltin dimalate, tin octylate, and other organotin compounds; isopropyltriisostearoyl titanate, isopropyltris (dioctylpyrophosphato)titanate, bis(dioctylpyrophosphato) oxyacetato titanate, tetraalkyl titanate, and other organotitanate compounds; tetrabutyl zirconate, tetrakis (acetylacetonato)zirconium, tetraisobutyl zirconate, butoxytris(acetylacetonato)zirconium, zirconium nathphenate, and other organozirconium compounds; tris (ethylacetoacetato)aluminum, tris(acetylacetonate) aluminum, and other organoaluminum compounds; zinc naphthenate, cobalt naphthenate, cobalt octylate, and other organometallic catalysts; diethanolamine, triethanolamine, and other amine-series catalysts that do not contain organosilicon compounds. The amount of component (C) is 0.1 to 20 parts by weight, and, from the standpoint of curability, preferably in the range of from 1 to 15 parts by weight per 100 parts by weight of component (A).

The hydrophobic surface treated dry process silica of component (D) is a reinforcing filler in the present composition. Component (D) is a hydrophobic surface treated dry process silica having a carbon content of 3.7 to 5% by weight and a bulk density of 40 to 99 g/L or a hydrophobic surface treated dry process silica with a carbon content of 2.7 to 5% by weight and a bulk density of 100 to 300 g/L. The use of hydrophobic surface treated dry process silica with such specific carbon content and bulk density makes it possible to obtain a coating agent of superior flowability, coating properties, and water repellent properties even without diluting it with a large amount of organic solvent. The carbon content mentioned in the present invention is a value determined using a CHN analyzer, and the bulk density is determined by filling a container of a predetermined volume with a hydrophobic surface treated dry process silica and weighing it. This type of hydrophobic surface treated dry process silica of component (D) is prepared, for example, by treating an untreated dry process silica with a BET specific surface area of 50 to 500 $m^2/g$ using hexamethyldisilazane, dimethyldichlorosilane, cyclic dimethylsiloxane, and other organosilicon compounds. A hydrophobic surface treated silica treated with hexamethyldisilazane is particularly preferable. A treatment process in which an excess amount of hexamethyldisilazane and water is used is suggested as a method for increasing the carbon content of the silica. In addition, processes in which compression is used or processes in which the silica is subjected to mechanical shear are suggested as methods for regulating the bulk density. In component (D), the hydrophobic surface treated dry process silica with a carbon content of 3.7 to 5% by weight and a bulk density of 40 to 99 g/L preferably has a carbon content within the range of from 3.8 to 4.5% by weight and bulk density within the range of from 50 to 95 g/L, and even more preferably has a carbon content that exceeds 4% and is not higher than 4.5% by weight. The other embodiment of component (D) which is a hydrophobic surface treated dry process silica with a carbon content of 2.7 to 5% and a bulk density of 100 to 300 g/L preferably has a carbon content in the range of from 2.8% to 4% and a bulk density of 100 to 200 g/L. The amount of component (D) is 8 to 50 parts by weight, and, from the standpoint of coating properties and water repellent properties, preferably in the range of from 9 parts by weight to 40 parts by weight per 100 parts by weight of component (A).

The organic functional silane coupling agent of component (E) is an adhesion-imparting agent specifically exemplified by γ-aminopropyltrimethoxysilane, γ-aminopropyltriethoxysilane, 3-(2-aminoethyl) aminopropyltrimethoxysilane, 3-(2-aminoethyl) aminopropyltriethoxysilane, 3-(2-aminoethyl) aminopropylmethyldimethoxysilane and other aminosilanes; 3-glycidoxypropyltrimethoxysilane, 3-glycidoxypropyltriethoxysilane, 3-glycidoxypropylmethyldimethoxysilane, and other epoxysilanes; as well as reaction products of the above-described aminosilanes and epoxysilanes. The amount of component (E) added to the present composition is 1 to 10 parts by weight, and preferably in the range of from 1.5 parts by weight to 8 parts by weight per 100 parts by weight of component (A).

The organic solvent of component (F) improves the coating properties of the present composition by adjusting its viscosity. Such an organic solvent should have a boiling point in the range of from 100° C. to 200° C. and be capable of dissolving component (A) and component (B), and is selected appropriately depending on the type and amount used. Specifically suggested organic solvents include toluene, xylene, naphthene (trade name: Naphthesol LL, from Nippon Petrochemicals Co., Ltd.), and other aromatic hydrocarbons; 2-pentanone, 4-methyl-2-pentanone, and other ketones; isoparaffin, normal paraffin (trade names: Isosol 200, 300, Normal Paraffin SL, from Nippon Petrochemicals Co., Ltd.), and other aliphatic hydrocarbons; butyl acetate, isobutyl acetate, and other esters; hexamethyldisiloxane, octamethyltrisiloxane, and other volatile silicones which may be used singly or as mixed solvents of two or more solvents. The amount of component (F) is from 4 wt % to 100 wt %, and preferably from 10 wt % to 50 wt % relative to the total of component (A) to component (E). This is due to the fact that when the amount is less than 4 wt%, the coating properties are poor and when it exceeds 100 wt % the coating film becomes too thin.

Although the present composition comprises the above-described component (A) to component (F), optionally a non-reactive silicone fluid with a viscosity of 10 mPa·s to 10,000 mPa·s may be added and combined therewith as component (G) in order to improve its water repellent properties. A representative example of such a silicone fluid is a polydiorganosiloxane that does not contain in its molecule condensation reactive groups, such as hydrolyzable groups and silanol groups. In addition to methyl, ethyl, propyl, and other alkyl groups; vinyl, allyl, and other alkenyl groups; phenyl, and other aryl groups, phenethyl, 2-phenylpropyl and other aralkyl groups, one may suggest polyether groups such as polyoxyethylene chains, polyoxypropylene chains, oxyethylene-oxypropylene chains as groups bonded to silicon atoms. It is recommended that aralkyl groups contained in the aforementioned groups constitute 2 to 40% of the total amount of silicon-bonded organic groups. Specific examples of component (G) include a fluid polydimethylsiloxane modified with polyoxyalkylene, a fluid copolymer of dimethylsiloxane, methyl(2-phenylpropyl)siloxane, and methyloctylsiloxane, a fluid copolymer of dimethylsiloxane, methyl(2-phenylpropyl)siloxane, a fluid copolymer of dimethylsiloxane and diphenylsiloxane, a fluid copolymer of dimethylsiloxane and methylvinylsiloxane, a fluid copolymer of dimethylsiloxane and methylphenylsiloxane, and a polydimethylsiloxane fluid having both molecular ends capped with trimethylsiloxy groups. The viscosity of component (G) at 25° C. is in the range of from 10 mPa·s to 10,000 mPa·s, and preferably in the range of from 50 mPa·s to 5,000 mPa·s. The amount of component (G) is 1 part by weight to 50 parts by weight, preferably 5 parts by weight to 40 parts by weight per 100 parts by weight of component (A).

Furthermore, various additives and fillers normally added to coating materials can be appropriately added to the present composition. Specifically suggested are titanium oxide, ultramarine blue, Prussian blue, zinc white, rouge, chrome yellow, lead white, carbon black, transparent iron oxide, aluminum powder, and other inorganic pigments; azo pigments, triphenylmethane pigments, quinoline pigments, anthraquinone pigments, phthalocyanine pigments, and other organic pigments; rust preventives, UV absorbers, photostabilizers, anti-sagging agents, leveling agents, and other additives; quartz micropowder, calcium micropowder, fumed titanium dioxide, diatomaceous earth, aluminum hydroxide, microparticulate alumina, magnesia, zinc oxide, zinc carbonate and fillers obtained by treating the surface of the above with silanes, silazanes, low-polymerized siloxanes, organic compounds, etc.; fluororesin micropowder and other resin powders.

As a method for preparing the present composition, a process is suggested in which the above-mentioned component (A) to component (F), or component (A) to component (G) are subjected to kneading using well-known kneading equipment, such as a Ross mixer, a Hobart mixer, a TORERO mixer, a roll mixer, a Henschel mixer, a Banbury mixer, a kneader-mixer, a flowjet mixer, a ball mill, a vibrating mill, a screw extruder, a paddle mixer, a ribbon mixer, and other kneading equipment. Also, in the process of mixing, the mixture may be heated, preferably to a temperature of 30 to 200° C. Although kneading can be carried out in an any order, possible examples may include a process, in which component (A) to component (G) are kneaded simultaneously; a process in which a solution is prepared by kneading component (A), component (B), and component (D), and another solution is prepared by kneading component (C), component (E), component (F), and component (G), followed by mixing the two solutions; and a process, in which a solution is prepared by kneading component (A), component (B), component (D), and component (G), and another solution is prepared by kneading component (C), component (E), and component (F), followed by mixing the two solutions. The viscosity of the composition of the present invention at 25° C. is typically in the range of from 1,000 mPa·s to 15,000 mPa·s. In addition, because the viscosity range fluctuates depending on the conditions, it is preferable to indicate the range by measuring it at 60 rpm using a V-type rotary viscometer (rotor No. 4).

Coating techniques which may be used with the present composition include, for example, dipping, spraying, brushing, and other techniques. After coating, the composition is normally allowed to cure at room temperature. Although the thickness of the coating film is not critical, it is preferable to use a thickness of 1 to 500 µm.

The above-described water repellent silicone coating agent composition can be used as a water repellent coating agent for various metal substrates, mortar board, slate board, concrete, wood, plastic substrates, glass, and ceramic surfaces. It is particularly useful as a water repellent coating agent for pipelines, tanks, and other facilities located in the vicinity of a seashore.

APPLICATION EXAMPLES

The present invention is specifically explained by referring to application examples. The present invention is not limited to the application examples described below. In the application examples, the term "part(s)" refers to "part(s) by weight." Viscosity is a value obtained at 25° C. by carrying out measurements using a V-type rotary viscometer (rotor No. 4) at 60 rpm. The amount of carbon in silica was determined using a CHN analyzer. To determine the bulk density {weight (g)/volume (L)}, about 10 g of silica was charged to a 250-mL measuring cylinder within 30 to 60 seconds and the weight of the silica was determined based on the difference in the weight of the measuring cylinder prior to and after charging, while the volume of the silica 120 seconds after charging the silica was read using a graduated scale. In addition, a self-leveling test was conducted which consisted of applying 2 g of the silicone coating agent composition onto an aluminum plate with a syringe and measuring the spread (diameter of the coating film: mm) of the coating film 24 hours later. The water repellent properties of the cured film were evaluated by measuring the water contact angle at 25° C. using a contact angle meter (from Kyowa Interface Science Co., Ltd.; trade name: CA-Z).

Reference Example 1

100 Parts of untreated dry process silica (BET specific surface area: 160 m$^2$/g), stirred at a high speed, was sprayed with 20 parts of hexamethyldisilazane and 12 parts water and stirred for 1 hour. A hydrophobic surface treated dry process silica was obtained by conducting agitation for another 5 hours at 150° C. in a stream of nitrogen. The carbon content of the resultant silica was 4.1% and its bulk density was 80 g/L.

Reference Example 2

The bulk density of 100 parts of dry process silica rendered hydrophobic by surface treatment with hexamethyldisilazane (BET specific surface area: 160 m$^2$/g, carbon content: 3%, bulk density: 60 g/L) was adjusted to 140 g/L by placing it in a ball mill and subjecting it to agitation. Its BET specific surface area and carbon content after agitation were the same as prior to agitation.

Reference Example 3

A flask was filled with 592 g of octamethylcyclotetrasiloxane, 120 g tetramethylcyclotetrasiloxane, and 46 g hexamethyldisiloxane. While being stirred and heated, the contents were combined with 0.4 g trifluoromethanesulfonic acid, and the mixture was maintained at 80° C. for three hours. Following this, the mixture was combined with 1.6 g hexamethyldisilazane with heating at 110° C. After bubbling nitrogen through the mixture and filtering, 700 g of a silicone fluid A were obtained. Then, 595 g of the obtained silicone fluid A were loaded into a flask and 5 wt. % of an isopropyl alcohol solution of chloroplatinic acid was added until concentration of the metallic platinum was 20 ppm. The solution was heated to 105° C., and after addition of 200 g of a-methylstyrene by dripping, the solution was stirred for 1 hour at 125° C. While being maintained at the above temperature, the solution was combined with 46 g 1-octene, heated to 135° C., and stirred for another 3 hours. Upon completion of stirring, volatile components were removed by distillation under vacuum and a silicone fluid B having a viscosity of 114 mPa·s and a refractive index of 1.4355 was obtained. An NMR analysis of the obtained fluid indicated the product was a diorganopolysiloxane having 2-phenylpropyl and octyl groups described by the following formula:

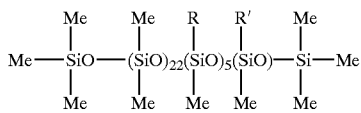

where Me designated methyl groups, R designates 2-phenylpropyl groups, and R' designates octyl groups.

Application Example 1

100 Parts polydimethylsiloxane with a viscosity of 4,000 mPa·s having both terminal ends of the molecular chain blocked by silanol groups, 20 parts hydrophobic surface treated dry process silica obtained in Reference Example 1 (BET specific surface area: 160 $m^2$/g, carbon content: 4.1%, bulk density: 80 g/L), and 18 parts methyltris(methylethylketoxime)silane were uniformly mixed. Subsequently, a silicone coating agent composition with a viscosity of 8,400 mPa·s was prepared by further adding and blending with the mixture 1.5 parts 3-(2-aminoethyl)aminopropyltrimethoxysilane, 0.5 parts dibutyltin dilaurate, and 38 parts xylene.

When a self-leveling test was conducted on the resultant composition, it was found that the diameter of the coating film was 38 mm and it had superior coating properties. In addition, a cured film was formed by applying the resultant composition to an aluminum plate and then allowing it to stand at room temperature for 1 week. The water contact angle of the cured film was 110°.

Application Example 2

100 Parts polydimethylsiloxane with a viscosity of 4,000 mPa·s having both terminal ends of the molecular chain blocked by silanol groups, 20 parts hydrophobic surface treated dry process silica obtained in Reference Example 1 (BET specific surface area: 160 $m^2$/g, carbon content: 4.1%, bulk density: 80 g/L), and 18 parts methyltris(methylethylketoxime)silane were uniformly mixed. Subsequently, a silicone coating agent composition with a viscosity of 8,000 mPa·s was prepared by further adding and blending with the mixture 1.5 parts 3-(2-aminoethyl)aminopropyltrimethoxysilane, 0.5 parts dibutyltin dilaurate, 38 parts xylene, and 5 parts of a polydimethylsiloxane fluid with a viscosity of 100 mPa·s having both terminal ends of the molecular chain blocked by trimethylsiloxy groups.

When a self-leveling test was conducted on the resultant composition, it was found that the diameter of the coating film was 40 mm and it had superior coating properties. In addition, examination of the surface of the coating film with an optical microscope at a magnification of 50 revealed that the surface was absolutely smooth. Furthermore, a cured film was formed by applying the resultant composition to an aluminum plate and then allowing it to stand at room temperature for 1 week. The water contact angle of the cured film was 112°.

Application Example 3

A silicone coating agent composition with a viscosity of 4,500 mPa·s was prepared by uniformly mixing 100 parts polydimethylsiloxane with a viscosity of 4,000 mPa·s having both terminal ends of the molecular chain blocked by silanol groups, 20 parts hydrophobic surface treated dry process silica obtained in Reference Example 2 (BET specific surface area: 160 $m^2$/g, carbon content: 3%, bulk density: 140 g/L), 18 parts methyltris(methylethylketoxime)silane, 1.5 parts 3-aminopropyltriethoxysilane, 0.5 parts dibutyltin dilaurate, and 38 parts xylene.

When a self-leveling test was conducted on the resultant composition, it was found that the diameter of the coating film was 44 mm and it had superior coating properties. In addition, examination of the surface of the coating film with an optical microscope at a magnification of 50 revealed that the surface was absolutely smooth. Furthermore, a cured film was formed by applying the resultant composition to an aluminum plate and then allowing it to stand at room temperature for 1 week. The water contact angle of the cured film was 110°.

Application Example 4

A silicone coating agent composition with a viscosity of 2,500 mPa·s was prepared by uniformly mixing 100 parts polydimethylsiloxane with a viscosity of 2,000 mPa·s having both terminal ends of the molecular chain blocked by silanol groups, 20 parts hydrophobic surface treated dry process silica obtained in Reference Example 2 (BET specific surface area: 160 $m^2$/g, carbon content: 3%, bulk density: 140 g/L), 18 parts methyltris(methylethylketoxime)silane, 0.4 parts dibutyltin dilaurate, 1.5 parts 3-(2-aminoethyl)aminopropyltrimethoxysilane, 10 parts of a polydimethylsiloxane fluid with a viscosity of 100 mPa·s having both terminal ends of the molecular chain blocked by trimethylsiloxy groups, and 14 parts xylene.

When a self-leveling test was conducted on the resultant composition, it was found that the diameter of the coating film was 50 mm and it had superior coating properties. In addition, examination of the surface of the coating film with an optical microscope at a magnification of 50 revealed that the surface was absolutely smooth. Furthermore, a cured film was formed by applying the resultant composition to an aluminum plate and then allowing it to stand at room temperature for 1 week. The water contact angle of the cured film was 110°.

Application Example 5

A silicone coating agent composition with a viscosity of 4,000 mPa·s was prepared by uniformly mixing 100 parts polydimethylsiloxane with a viscosity of 4,000 mPa·s having both terminal ends of the molecular chain blocked by silanol groups, 20 parts hydrophobic surface treated dry process silica obtained in Reference Example 2 (BET specific surface area: 160 $m^2$/g, carbon content: 3%, bulk density: 140 g/L), 18 parts methyltris(methylethylketoxime)silane, 1.5 parts 3-aminopropyltrimethoxysilane, 0.5 parts dibutyltin dilaurate, 10 parts of silicone fluid B obtained in Reference Example 3, and 38 parts xylene. When a self-leveling test was conducted on the resultant composition, it was found that the diameter of the coating film was 50 mm and it had superior coating properties. In addition, examination of the surface of the coating film with an optical microscope at a magnification of 50 revealed that the surface was absolutely smooth. Furthermore, a cured film was formed by applying the resultant composition to an aluminum plate and then allowing it to stand at room temperature for 1 week. The water contact angle of the cured film was 110°.

Comparative Example 1

A silicone coating agent composition was prepared in the same manner as in Application Example 1 with the exception of using 20 parts of a dry process silica (BET specific surface area: 180 m²/g) with a carbon content of 2% and a bulk density of 50 g/L rendered hydrophobic by surface treatment with hexamethyldisilazane instead of 20 parts of the hydrophobic surface treated dry process silica obtained in Reference Example 1, which was used in Application Example 1. When the viscosity of the resultant composition was measured, it was found to be 12,000 mPa·s, which represented an increase in viscosity of 3,600 mPa·s in comparison with the composition of Application Example 1.

When a self-leveling test was conducted on the resultant composition, it was found that the diameter of the coating film was 33 mm and the composition had insufficient coating properties. In addition, examination of the surface of the coating film with an optical microscope at a magnification of 50 revealed that the surface had microscopic voids. The water contact angle of the obtained cured film was 109°.

We claim:

1. A water repellent silicone coating agent composition comprising
   (A) 100 parts by weight of diorganopolysiloxane having a viscosity of 20 to 20,000 mPa·s at 25° C. in which the terminal ends of the molecular chain are blocked by silanol groups or silicon-bonded hydrolyzable groups,
   (B) 5 to 100 parts by weight of a cross-linking agent represented by general formula $R_aSiX_{4-a}$ in which R is a monovalent hydrocarbon group comprising 1 to 10 carbon atoms, X is a hydrolyzable group, and subscript a is an integer of 0 to 2,
   (C) 0.1 to 20 parts by weight of a condensation reaction catalyst,
   (D) 8 to 50 parts by weight of a hydrophobic surface treated dry process silica having a carbon content of 3.7 to 5% by weight and a bulk density of 40 to 99 g/L, or a hydrophobic surface treated dry process silica having a carbon content of 2.7 to 5% by weight and a bulk density of 100 to 300 g/L,
   (E) 1 to 10 parts by weight of an organic functional silane coupling agent-based adhesion-imparting agent,
   (F) an organic solvent having a boiling point of 100 to 200° C. in an amount of 4 to 100 wt % based on the total of component (A) to component (E), and
   (G) 1 to 50 parts by weight of a non-reactive silicone fluid having a viscosity of 10 to 10,000 mPa·s at 25° C., wherein component (G) is a polydiorganosiloxane that does not contain in its molecule condensation reactive groups, and wherein aralkyl groups constitute 2 to 40% of the total amount of silicon-bonded organic groups of component(G).

2. A composition according to claim 1 where component (A) is dimethylpolysiloxane having both terminal ends of the molecular chain blocked by silanol or methoxy groups.

3. A composition according to claim 1 where component (A) has a viscosity of 40 to 15,000 mPa·s at 25° C.

4. A composition according to claim 1 where component (B) is selected from the group consisting of tetrakis (methylethylketoxime)silane, methyl tris (methylethylketoxime)silane, vinyl tris (methylethylketoxime)silane, methyltrimethoxysilane, methyltriethoxysilane, dimethyldimethoxysilane, dimethyldiethoxysilane, methyltriacetoxysilane, tetramethoxysilane, tetraethoxysilane, methyltriisopropenoxysilane, tetraisopropenoxysilane, and methyl tri(N,N-diethylamino)silane.

5. A composition according to claim 1 where component (B) is methyl tris(methylethylketoxime)silane.

6. A composition according to claim 1 comprising 8 to 40 parts by weight of component (B) per 100 parts by weight of component (A).

7. A composition according to claim 1 comprising 1 to 15 parts by weight component (C) per 100 parts by weight of component (A).

8. A composition according to claim 1 where the dry process silica of component (D) is treated with hexamethyldisilazane.

9. A composition according to claim 1 where component (D) has a carbon content within a range of from 3.8 to 4.5% by weight and a bulk density within a range of from 50 to 95 g/L.

10. A composition according to claim 1 where component (D) has a carbon content within a range of from 2.8% to 4% by weight and a bulk density of 100 to 200 g/L.

11. A composition according to claim 1 comprising 9 to 40 parts by weight of component (D) per 100 parts by weight of component (A).

12. A composition according to claim 1 comprising 1.5 to 8 parts by weight of component (E) per 100 parts by weight of component (A).

13. A composition according to claim 1 where component (E) is selected from the group consisting of γ-aminopropyltrimethoxysilane, γ-aminopropyltriethoxysilane, 3-(2-aminoethyl) aminopropyltrimethoxysilane, 3-(2-aminoethyl) aminopropyltriethoxysilane, 3-(2-aminoethyl) aminopropylmethyldimethoxysilane, 3-glycidoxypropyltrimethoxysilane, 3-glycidoxypropyltriethoxysilane, and 3-glycidoxypropylmethyldimethoxysilane.

14. A composition according to claim 1 where component (E) is selected from the group consisting of aminosilanes, epoxysilanes, and reaction products of the aminosilanes and the epoxysilanes.

15. A composition according to claim 1 comprising 10 to 50 weight percent of component (F) relative to the total of component (A) to component (E).

16. A composition according to claim 1 where component (G) is chosen from a fluid polydimethylsiloxane modified with polyoxyalkylene; a fluid copolymer of dimethylsiloxane, methyl (2-phenylpropyl)siloxane, and methyloctylsiloxane, a fluid copolymer of dimethylsiloxane and methyl(2-phenylproyl)siloxane; a fluid copolymer of dimethylsiloxane and diphenylsiloxane; a fluid copolymer of dimethylsiloxane and methylvinylsiloxane; a fluid copolymer of dimethylsiloxane and methylphenylsiloxane; and a polydimethylsiloxane fluid having both molecular ends capped with trimethylsiloxy groups.

17. A composition according to claim 1 where component (G) is a polydimethylsiloxane fluid having both terminal ends blocked by trimethylsiloxy groups.

18. A composition according to claim 1 comprising 5 to 40 parts by weight of component (G) per 100 parts by weight of component (A).

* * * * *